Oct. 27, 1925.

H. H. THOMPSON

GYROSCOPIC STABILIZING SYSTEM

Filed April 13, 1920     2 Sheets-Sheet 1

INVENTOR
HERBERT H. THOMPSON
By E. Cummings Sanborn
HIS ATTORNEY.

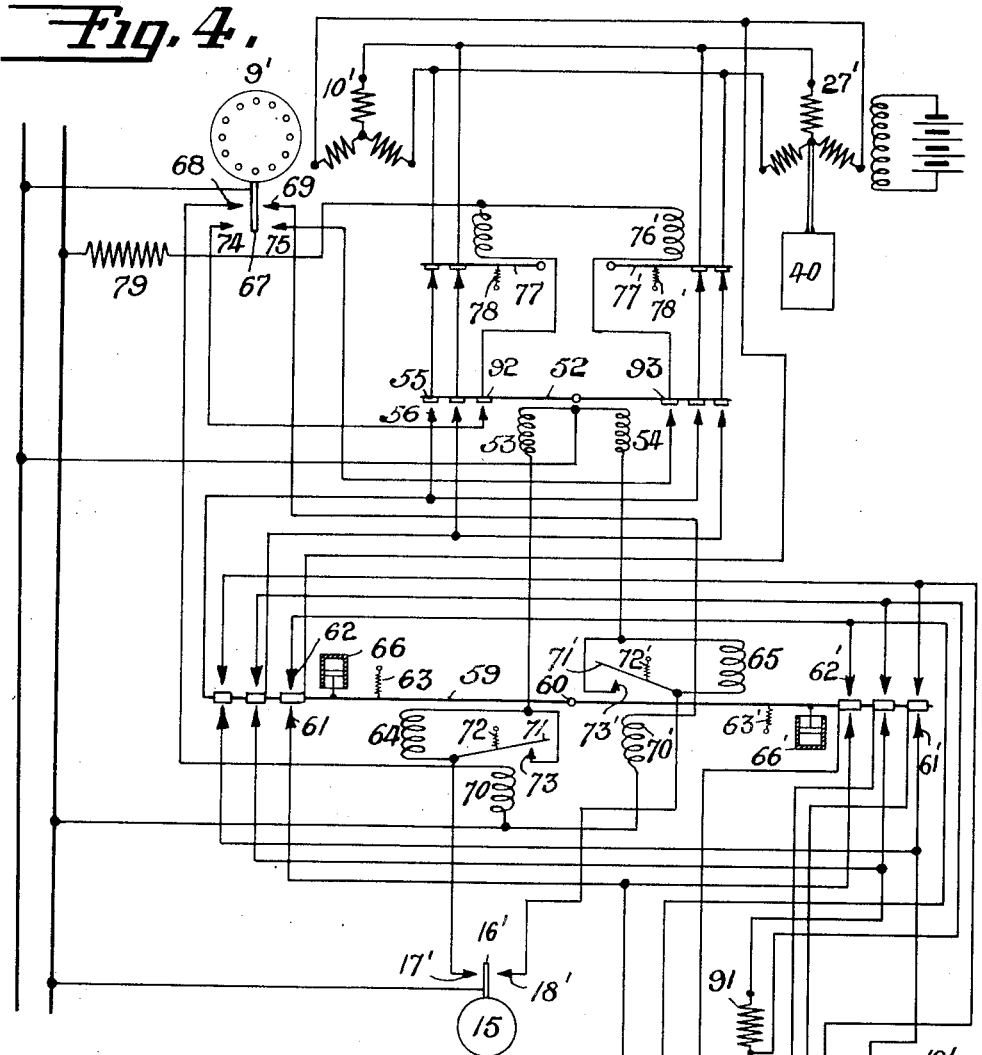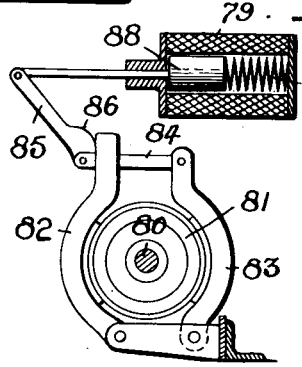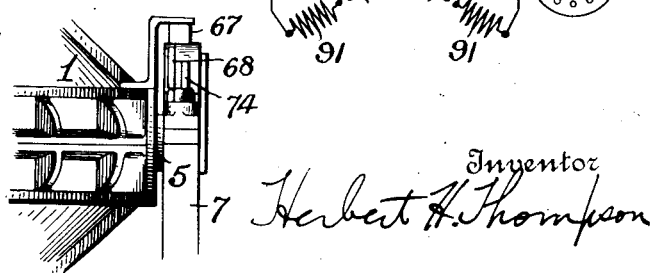

Patented Oct. 27, 1925.

1,558,721

UNITED STATES PATENT OFFICE.

HERBERT H. THOMPSON, OF BROOKLYN, NEW YORK, ASSIGNOR TO THE SPERRY GYROSCOPE COMPANY, OF BROOKLYN, NEW YORK, A CORPORATION OF NEW YORK.

GYROSCOPIC STABILIZING SYSTEM.

Application filed April 13, 1920. Serial No. 373,659.

*To all whom it may concern:*

Be it known that I, HERBERT H. THOMPSON, a citizen of the United States of America, residing at 1487 East 18th Street, Brooklyn, in the county of Kings and State of New York, have invented certain new and useful Improvements in Gyroscopic Stabilizing Systems, of which the following is a specification.

This invention relates to gyroscopic stabilizing systems for ships and other oscillatory bodies wherein one or more stabilizing gyroscopes are precessed by means of a precession motor or engine. The control of gyroscopes of the size and character employed has been found very difficult because of the enormous forces involved and the necessity not only of precessing the gyroscope but also of braking the precession and bringing the gyroscope to rest during each roll of the ship. The purpose of this invention is to employ the energy utilized in braking the precession of the gyroscope to assist in driving the rotor of the gyroscope, and further to utilize the energy of the rotor to aid the precession motor whenever the peak load on the motor occurs. By this means a considerable saving in motive power may be effected and the size of the generating plant required to supply the driving power for the gyro rotor and the precession engine may be considerably reduced. This application is a continuation in part of my earlier application 182,189 filed July 23, 1917, for "controlling and braking devices for ships' gyroscopes," in which application I disclosed one form of means for carrying into effect the purposes above stated. This invention also has application to stabilizing devices for ships of other than gyroscopic character, since in all such devices the problem of accelerating and de-celerating a moving mass during the comparatively short rolling cycle of the ship is an important one.

Referring to the drawings wherein I have shown what I now consider the preferred forms of my invention:

Fig. 4 is a wiring diagram of another form of my invention.

Fig. 5 is a detail view of a brake.

Fig. 6 is a detail view of an arrangement of contacts on the gyroscope in connection with the form of invention of Fig. 4.

Figure 1:
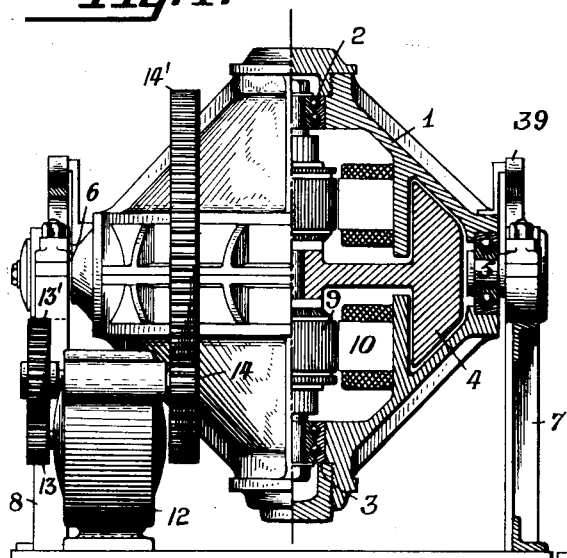
Fig. 1 is a front elevation partly in section of an electrically driven gyroscope as mounted on a ship.
Figure 2:
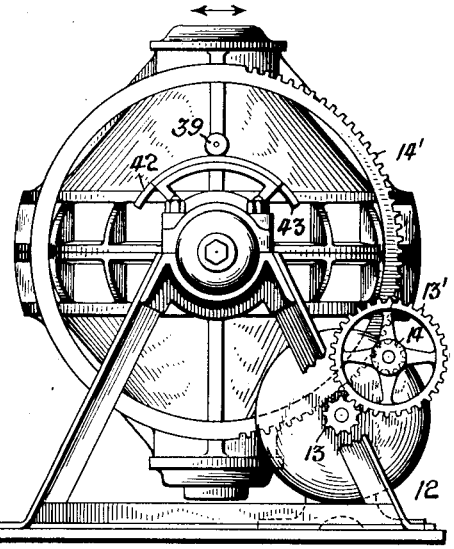
Fig. 2 is a side elevation of the same, the direction of the fore and aft line of the ship being indicated by the arrow.

In Figs. 1 and 2 the gyroscope is shown as comprising a casing 1 in which is journalled, in vertical bearings 2 and 3, the rotor 4 of the gyroscope. The casing or rotor bearing frame is mounted for oscillation on normally horizontal trunnions 5 and 6 supported by heavy brackets 7 and 8 on the floor of the ship. Trunnions 5 and 6 are preferably placed athwartships as indicated in Fig. 2 by the arrow representing the fore and aft line of the ship. The gyroscope is shown as driven by placing on the rotor shaft an armature 9 of an electric motor, the field 10 being supported from casing 1.

In the form shown the aforesaid motor is a three phase induction motor of the type commonly used in driving gyro rotors. The oscillations of the gyroscope about trunnions 5 and 6 are controlled by a motor or other translating device 12 which is shown as geared to the casing through gearing 13, 13', 14, and 14' interposed between said motor and casing.

Figure 3:
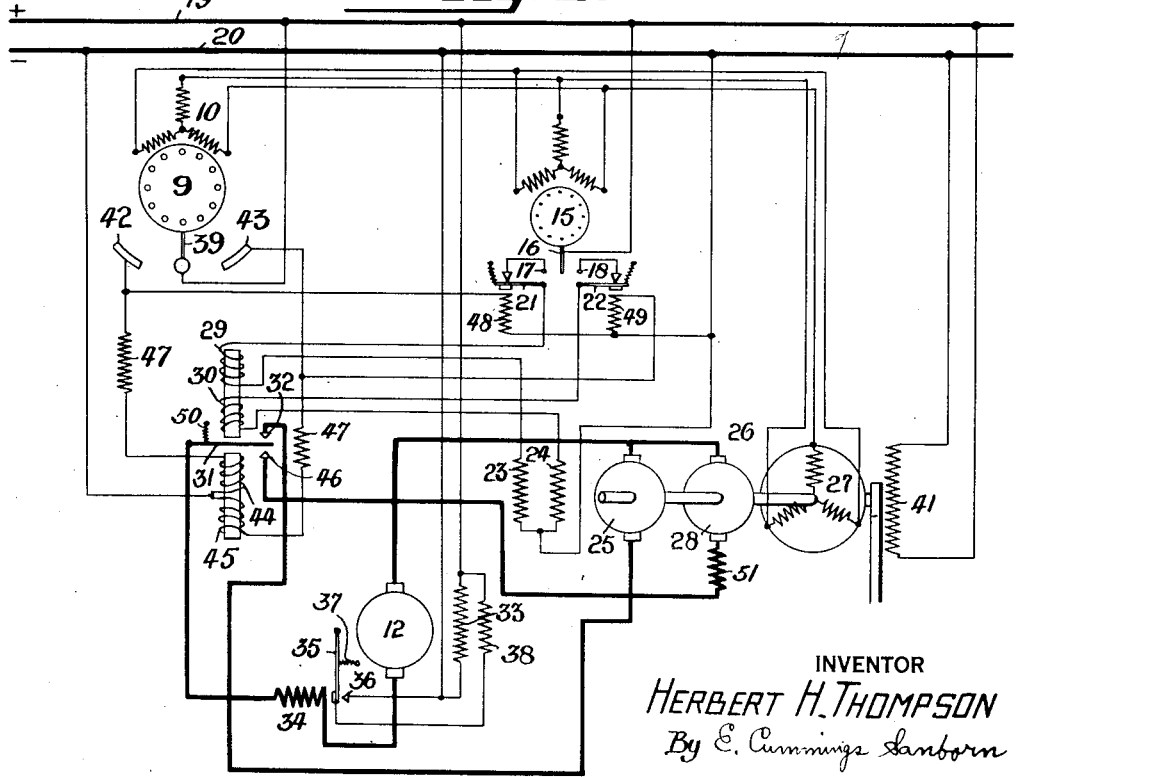
Fig. 3 is a wiring diagram of one form of my invention.

The motor 12 is shown of the direct current type and is adapted to be controlled by the auxiliary control gyroscope 15, shown diagrammatically in Fig. 3. Since the control gyroscope is of a type well known in the art I have not shown it in detail. It will readily be understood by those skilled in the art that, as soon as the ship starts to roll in one direction or the other, the precession of the control gyro will move the contact 16 mounted thereon into contact with either one or the other of relatively stationary contact points 17 or 18 and complete the circuits hereinafter described.

Contact 16 is shown connected to one of supply mains 19, 20, while contacts 17 and 18 are shown connected through switches 21, 22, with oppositely wound field windings 23, 24 respectively of generator 25, said windings being connected with the other supply main. Generator 25 is shown as part of a turbo-generator set or the like 26, comprising an A. C. generator 27 and an auxiliary D. C. motor 28. As shown, generator 27 serves to furnish current for the main and control gyroscopes.

It will be seen from the construction and arrangement above set forth that with switches 21 and 22 in the position shown, precession of control gyro 15 in either direction, in response to the roll of the ship, will cause one or the other of field windings 23, 24 to be energized. At the same time one or the other of coils 29, 30 in circuit with windings 23, 24, respectively, will be energized to attract relay armature 31 into engagement with contact 32, thereby closing a circuit through generator 25 and motor 12. Motor 12 is shown provided with a separately excited field 33 connected across mains 19, 20, and, it will be evident from the connections shown that said motor will be driven to precess the main gyroscope in one direction or the other in accordance with that one of windings 23, 24 of generator 25 which is energized. Since the precession motor is driven at full speed in one direction, then stopped and driven at full speed in the opposite direction and also driven at somewhat lower speeds, all during each complete cycle of the ship's roll, it will be seen that the electrical requirements of the motor fluctuate widely and vary from zero to maximum in a short while. By the arrangement which I have shown in Fig. 3 the size and capacity of the generating set may be reduced to a minimum since, when the peak load on the precession motor occurs and the speed of generator 27 is consequently reduced, the rotor 4 drives induction motor 9—10 at a speed in excess of the reduced frequency of generator 27. Hence motor 9—10 becomes a generator and pumps current back into the line. Generator 27 is thereby driven as a motor and aids the main power source, such as a turbine shown at 40 in Fig. 4, in driving generator 25 and precession motor 12. It will be readily appreciated by those skilled in the art that the heavy gyro rotor 4 possesses an enormous amount of kinetic energy, so that its action as a generator for a short period does not materially affect its speed. With a suitable design of generator 27 and induction motor 9—10 it will thus readily be seen that when motor 12 requires an extra heavy current the load on generator 25 will be partly borne by generator 27 acting as a motor and assisting in driving precession motor 12. The field 41 of generator 27 may be connected directly across mains 19 and 20 as shown.

In order to limit the speed of precession and at the same time conserve the energy of the stabilizing system as much as possible I prefer to cause machine 12 to act as a generator and to aid in driving rotor 4 by driving generator 25 as a motor. One means for effecting this purpose is to strengthen the separately excited field of said motor when the precession speed exceeds a predetermined value. As shown in Fig. 3 a coil 34 in series with the motor armature serves to attract armature 35 away from contact 36 as long as sufficient current flows through the coil. When, however, the speed of the motor exceeds a predetermined amount the current through coil 34 is reduced to such an extent that spring 37 retracts armature 35 into engagement with contact 36, thereby throwing auxiliary field coil 38 in circuit across mains 19, 20. The counter-electromotive force of the motor is thus raised so that its speed will be reduced; and, if the speed of precession is sufficient, it will be converted into a generator by forcing current back through generator 25 and driving the latter as a motor. At the same time a braking force will be exerted on the main gyroscope.

When the main or stabilizing gyroscope approaches the limit of its oscillation in any direction means are employed to exert a maximum braking force on the gyroscope so as to bring it to rest. At the same time, by the means which I have provided, the energy utilized in bringing the gyroscope to rest may aid in driving the rotor 4. One form of means for accomplishing this result may be constructed and arranged substantially as follows:

Mounted on gyro casing 1 is an arm or trolley 39 which is adapted to contact with and slide across contact sectors 42 and 43 positioned at predetermined angles to the vertical. Trolley 39 is shown connected with one of mains 19, 20, while contacts 42, 43 are connected with the opposite main, coils 44 and 45 being inserted in the connection between the last mentioned main and said contacts 42 and 43, respectively. Either of said coils, when energized, is adapted to attract armature 31 into engagement with contact 46 and thus break the circuit between motor 12 and generator 25 and establish a circuit through motor 12 and machine 28. Resistances 47 are shown in circuit with magnet coils 44, 45 to indicate that they are weaker than magnet coils 29, 30. Also interposed between contacts 42, 43, respectively, and main 20 are coils 48, 49 adapted when energized to attract armatures 21, 22, respectively, and thereby break the circuit through one or the other of field windings 23, 24. Armature 31 is normally held in engagement with contact 32, both by excitation of windings 29, 30 and preferably also by a spring 50.

The action of the structure above described is as follows: Let us suppose that the ship is rolling so that gyroscope 15 has brought contacts 16 and 17 into engagement. Field coil 23 is thereby energized and the main gyroscope precessed by motor 12. If the speed of precession tends to exceed a certain limit auxiliary field coil 38 is energized to cause a braking action as above explained. As the roll continues contacts 39 and 42 will be brought into engagement. This will cause the excitation of coil 48 so that the circuit through winding 23 will be broken. Coil 44 will also be excited to withdraw armature 31 from engagement with contact 32 and into engagement with contact 46, thus breaking the circuit between machines 12 and 25 and establishing a circuit between machines 12 and 28. Motor 28 is preferably designed with a very low resistance and low counter-electromotive force so that machine 12, being driven by the precession of the main gyroscope and thereby acting as a generator, will cause a heavy current to be circulated in the last mentioned circuit, thereby braking and bringing to rest the main gyro and at the same time aiding in driving rotor 4 by assisting the prime mover in driving generator 27. When the ship starts to roll back contacts 16 and 18 will close establishing a circuit through coil 30 and field winding 24. Coil 30 being more powerful than coil 44, and being also aided by spring 50, will attract armature 31 into engagement with contact 32 and thus again establish a circuit between machines 12 and 25. The latter machine acting as a generator will now cause motor 12 to precess the main gyroscope in the opposite direction. Upon the speed of precession becoming too great, auxiliary field coil 38 will be again energized as above set forth to brake the main gyro, and, when contact 39 engages contact 43 a circuit as above described will be established between machines 12 and 28 causing a powerful braking torque to be exerted upon the main gyroscope and bringing the latter to rest. At the same time, as above explained, the forces used in braking the gyroscope assist in driving the gyro rotor. Motor 28 is shown herein as a series motor, the field thereof being indicated at 51.

Another form which my invention may assume is illustrated in Fig. 4 wherein precession motor 12' is shown as a three phase induction motor. Thus only one generator 27' need be employed to furnish current for both the precession motor and the motor 9'—10' which drives the main gyro rotor.

Interposed in the connections between generator 27' and precession motor 12' is a reversing switch which may, as shown, consist of an armature 52 pivoted at its center and carrying at its ends suitably insulated contacts connected with the generator 27' and adapted to be brought into engagement with contacts connected with the precession motor 12'. Armature 52 may be normally held by any suitable means in the position shown in Fig. 4 wherein the armature contacts are out of engagement with the precession motor contacts. When, however, one or the other of coils 53, 54 is energized the corresponding end of armature 52 will be attracted to engage the adjacent precession motor contacts. From the connections shown in Fig. 4 it will be evident that when contacts 55 of armature 52 engage contacts 56 precession motor 12' will be driven in one direction, while when contacts 57 and 58 are in engagement motor 12' will be driven in the opposite direction. The energization of the coils 53 and 54 may be controlled by the control gyroscope 15' in the following manner: An arm 16' movable with the control gyro is connected to one of mains 19', 20' and is adapted to engage one or the other of contacts 17', 18' the latter contacts being connected with coils 53, 54, respectively, and said coils being connected as shown with other of mains 19', 20'. Consequently one or the other of coils 53, 54 will be energized depending upon the direction of precession of gyroscope 15', which, in turn, depends upon the direction of roll of the ship.

As in the form of invention shown in Fig. 3, the induction motor 9'—10' serves to assist generator 27' in driving motor 12' when the peak load on motor 12' occurs, owing to the fact that the gyro rotor continues to rotate at a substantially constant speed and pumps back current into the line when the load on motor 12' has reduced sufficiently the frequency of generator 27'.

As will be readily understood, with suitable reduction gearing between motor 12' and the main gyro, said motor 12' may be caused to act as a generator when the speed of precession of the main gyroscope exceeds a predetermined amount. In other words, with the parts so designed that upon the speed of precession of the main gyro exceeding a certain limit the rotor of precession motor 12' will be driven at a speed greater than that of the stator magnetism, motor 12' will be driven as a generator and will not only brake the precession of the main gyro but will also pump back current into the line and assist generator 27' in driving the main gyro rotor. The amount of this braking effect depends, of course, upon the speed of rotation of the magnetic field in the stator winding 90 of the induction motor 12', and this speed of rotation can be varied by varying the number of field poles in said stator windings, as will be readily understood by those skilled in the art. While various means may be provided for varying the number of poles I have shown a pole changer comprising an extended armature 59 pivoted at 60, which is adapted to be actuated according to a predetermined cycle of operation. Each end of the armature is shown provided with contacts adapted to be connected with generator 27' through relay armature 52 and adapted to be engaged with one or the other of a pair of sets of contacts connected with the field of motor 12' and so connected that the number of field poles is varied in accordance with the set of said contacts engaged by said armature. A special winding 90 is provided for said stator such that the phase of a portion of winding 91 may be reversed at will and when so reversed, the number of poles is lessened, say by one-half. It will be understood of course that the proper relationship of the poles is maintained, i. e., that the intermediate excited poles are maintained of opposite polarity to the adjacent excited poles, as will be readily understood by those skilled in the art. The wiring diagram represents merely the special three phrase winding, no attempt being made to show the poles themselves. Thus contacts 62', 61' are connected to give the lesser number of poles and contacts 62, 61' to give a greater number, as shown diagrammatically. Springs 63, 63' serve to maintain armature 59, normally in engagement with contacts 62, 61'. Coils 64, 65 in series with coils 53, 54, respectively, each serve when energized to attract said armature into engagement with contacts 61, 62', against the action of the springs.

It will now be seen that if gyro 15' precesses to bring contacts 16', 17' into engagement, a circuit will be closed through coils 64 and 53. Armature 52 will thereby be attracted to bring contacts 55 and 56 into engagement and motor 12' will be driven to precess the gyroscope in the corresponding direction. It will be noted that at the time contacts 16' and 17' come into engagement the greater number of field poles are in circuit so that a large starting torque may be obtained. In order to maintain armature 59 momentarily in engagement with contacts 61 after coil 64 is energized any suitable retarding means may be connected with said armature. By way of example I have shown dashpots 66 and 66' connected with said armature.

When armature 59 engages contacts 62 61' the lesser number of field poles of motor 12' are thrown in circuit, whereupon the speed of precession of the main gyroscope is rapidly increased. Now as the speed of precession tends to increase beyond a certain limit the precession motor 12', as above explained, serves to brake such precession and pumps current back into the line and aids generator 27' in driving the main gyro rotor. At a certain point in the precession I prefer to increase the number of field poles of motor 12' in order to increase the braking effect thereof as well as to increase the current forced back by said motor into the line. One type of means for accomplishing this result may be constructed and arranged substantially as follows:

Movable with the main gyro casing is a contact 67 adapted to be brought into engagement with one or the other of stationary contacts 68, 69. In circuit with said contacts are magnet coils 70, 70', respectively, adapted to attract armatures 71, 71', respectively. Armature 71 is shown normally retracted by a spring 72 and, when attracted by coil 70 into engagement with contact point 73, serves to short circuit coil 64. Similarly armature 71', when attracted by coil 70', to engage contact 73', short circuits coil 65. A spring 72' normally holds armature 71' out of contact with contact point 73'. From this construction it will now be seen that, when the main gyroscope precesses sufficiently to bring contact 67 into engagement with one or the other of contacts 68, 69, both of coils 64, 65 will be short circuited and their armatures retracted into position for throwing into circuit a greater number of field poles of induction motor 12'. Thus, assuming that contacts 16', 17' have been closed by the control gyro, the main gyro upon precessing a sufficient distance will bring contacts 67 and 68 into engagement. Coil 64, which has previously been energized to cause the lesser number of field poles to be thrown into circuit will now be short circuited, whereupon armature 59 will be retracted by springs 63 and 63' into engagement with contacts 61 and the greater number of field poles will be in circuit. A maximum braking effect will now be exerted upon the main gyro and the maximum of current will be forced by motor 12' back into the supply mains.

As the main gyro further approaches its limit of precession means may be provided for cutting the precession motor out of circuit and applying a brake to stop further precession of the main gyro. One type of means for accomplishing this may be constructed as follows: Contacts 74, 75 may be arranged, as shown in Fig. 4, to be engaged by contact 67 upon precession of the main gyro in one direction or the other. In Fig. 6 the relative arrangement of contact 67 is shown more clearly in connection with contacts 68 and 74. The arrangement of the contacts is such that contact 67 is first brought into engagement with one of contacts 68, 69, before engaging with the corresponding one of contacts 74, 75. Contacts 68, 69, 74, and 75, are, of course, suitably insulated from each other.

In circuit with contact 74 is a coil 76, which, when excited, serves to attract an armature 77 and thus break the connection between generator 27' and contacts 55. Likewise in circuit with contact 75 is a coil 76' which is adapted when energized to attract armature 77' to break the connection between contacts 57 and generator 27'. Spring 78, 78' may be employed to hold armatures 77, 77' normally in such position that contacts 55 and 57 are in circuit with generator 27'. The circuits of the back contacts 74 and 75 are carried through back contacts 92 and 93 respectively on switch arm 52, so that when the control gyro 15 reverses, i. e., breaks contact with the contact 17' or 18' with which it is then in engagement, the cut-out switch 77 or 77' then operative is thrown out by the de-energizing of the coil 76 or 76' and the main circuits reestablished through the action of the springs 78 or 78', so that the main gyroscope is free to act to oppose the reverse roll.

For applying a brake to the gyroscope when the latter is approaching the limit of its precessional movement I have shown a solenoid 79 adapted to be energized when contact 67 engages with either of contacts 74, 75. Being in circuit with coils 66 and 66', the brake 79 also is released when the control gyro reverses. One form of braking means which may be employed is shown in detail in Fig. 5 and may be constructed substantially as follows:

On a shaft 80, which may be the precession motor drive shaft or any other shaft connected with the main gyroscope, is mounted a brake drum 81. Adapted to grip said drum are pivoted arms 82, 83 to one of which is pivoted a link 84. Mounted pivotally at one end of said link is a second link 85 having a cam surface 86 adapted to engage part of the periphery of the other arm 82. Link 85 is shown connected with the core 88 of solenoid 79. A spring 87 may act to normally force core 88 of solenoid 79 to the position shown in Fig. 5, wherein arms 82 and 83 loosely surround drum 81. When, however, solenoid 79 is energized, link 85 and cam surface 86 are turned to cause arms 82 and 83 to grip drum 81 tightly and apply a positive braking force to further precession of the main gyro.

The operation of the form of invention disclosed in Fig. 4 will now be clear. Assuming that the ship rolls in such direction as to bring contacts 16' and 17' into engagement, armature 52 will be attracted to close a circuit through the field windings of motor 12'. The latter will thereupon be driven to precess the main gyro in the proper direction to counteract the ship's roll. At the time that the circuit through the field windings of motor 12' is closed armature 59 is still in such position as to leave the maximum number of field poles in circuit, and will be kept momentarily in such position by dash pots 66, 66' even though coil 64 was energized simultaneously with coil 53. Great starting torque of the precession motor is thereby secured. Immediately thereafter, armature 59 comes into engagement with contacts 61 whereby a lesser number of field poles is thrown in circuit and the speed of precession of the main gyro is increased. When the peak of the load on motor 12' is reached, the rotor of the main gyro drives motor 9'—10' as a generator and assists generator 27' in driving the precession motor. When, on the other hand, the speed of precession tends to increase beyond a certain limit, motor 12' is driven as a generator and assists generator 27' in driving the motor 9'—10'. At the same time, motor 12' absorbs energy from the precession of the main gyro. As the main gyro precesses further and approaches the limit of precession, contacts 67 and 68 come into engagement and short circuit coil 64, whereupon armature 59 again engages with contacts 62 and throws the maximum number of field poles of motor 12' into circuit with generator 27'. The braking effect of motor 12' on precession of the main gyro is thus increased as is also the current forced by said motor back into the line to aid in the driving of the rotor of the main gyro. As the main gyro approaches further its limit of precession, contacts 67 and 74 engage and cause the circuit between generator 27' and motor 12' to be broken and solenoid 79 to be energized to apply the brake to the precession motor. Now, when the ship rolls back in the opposite direction, contacts 16' and 18' engage, the brake is released and the gyro is precessed in the opposite direction, and the above mentioned cycle is repeated.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination with the rotor of a gyroscope, means for precessing said gyroscope, means for driving said rotor, means for absorbing energy from the precession of said gyroscope and transferring said energy to said driving means, and means for absorbing energy from said rotor and transferring said energy to said precessing means.

2. In combination with the rotor of a gyroscope, means for driving said rotor, means for precessing said gyroscope, means for limiting the speed of precession, means for absorbing energy from said rotor and transferring said energy to said precessing means, and means for absorbing energy used in limiting the speed of precession and transferring the latter energy to said rotor.

3. In combination with a gyroscope, means for precessing said gyroscope, means for driving the rotor of said gyroscope, means for transferring energy from said precessing means to said driving means, and means for transferring energy from said driving means to said precessing means.

4. In combination, a gyroscope mounted for oscillation about an axis, means for causing oscillation of said gyroscope to aid in rotating the rotor thereof, and means for causing rotation of said rotor to aid in oscillating said gyroscope.

5. In combination with the rotor of a gyroscope, means for driving said rotor, means for precessing said gyroscope, means for transferring energy from said rotor to said precessing means, and means for simultaneously limiting the speed of precession and assisting in the driving of said rotor.

6. In combination with the rotor of a gyroscope, means for utilizing part of the energy of said rotor in precessing said gyroscope, and means for utilizing part of the energy of precession in driving said rotor.

7. In combination with the rotor of a gyroscope, precessing means for said gyroscope, means for transferring energy from said rotor to said precessing means, and means for transferring energy from the precession of said gyroscope to said rotor.

8. In combination with a gyroscope, means for precessing said gyroscope, means for transferring energy from the rotor of said gyroscope to said precessing means, and means called into action when a certain speed of precession of said gyroscope is attained for assisting in the driving of said rotor.

9. In combination with a gyroscope, means for precessing said gyroscope, means for transferring energy from the rotor of said gyroscope to said precessing means, means called into action when a certain speed of precession of said gyroscope is attained for transferring energy from such precession to said rotor, and automatically operable means for increasing the amount of energy so transferred.

10. In combination with a gyroscope, means for precessing said gyroscope, means for driving the rotor of said gyroscope, means for transferring energy from said rotor to said precessing means, means for transferring energy from the precession of said gyroscope to said rotor, and means called into action at a definite point in such precession for increasing the amount of energy so transferred.

11. In combination with a gyroscope, means for precessing said gyroscope, means for driving the rotor of said gyroscope, means for transferring energy from said rotor to said precessing means, means called into action when a certain speed of precession of the gyroscope is reached for braking such precession and transferring energy to said rotor, and means for increasing said braking effect.

12. In combination with a gyroscope, means for precessing said gyroscope, means for driving the rotor of said gyroscope, means for transferring energy from said rotor to said precessing means, means called into action when the precession of the gyroscope reaches a definite speed for braking such precession and transferring energy to said rotor, and means called into action at a certain point in the precession of said gyroscope for increasing the amount of energy transferred.

13. In combination with a gyroscope, means for precessing said gyroscope, means for driving the rotor thereof, means for transferring energy from said rotor to said precessing means, means called into action when the precession of the gyroscpe exceeds a predetermined amount for causing such precession to aid in driving the rotor, means called into action at a certain point in such precession for increasing the effect of such precession in driving the rotor, and means called into action at another point in the precession for reenergizing said precessing means and braking said precession.

14. In combination with a gyroscope, means for precessing said gyroscope, means called into action when a certain speed of precession is attained for causing said precession to aid in driving the rotor of the gyroscope, means for automatically increasing the effect of such precession upon the driving of the rotor, and means called into action at a certain point in said precession for deenergizing said precessing means and applying a brake to said gyroscope.

15. In combination with a gyroscope, means for precessing said gyroscope, means for automatically increasing the speed of precession, means called into action when a certain speed of precession is attained for causing said precession to aid in driving the rotor of the gyroscope, and means for transferring energy from said rotor to said precessing means when the load on the latter reaches a predetermined amount.

16. In a gyroscopic stabilizer, the combination with the rotor, of a substantially constant speed motor spinning said rotor, an electric power plant for driving said motor, a second motor for controlling the precession of the gyroscope driven from said power plant, said motors and power plant being adapted either to absorb or to deliver energy in such a manner as to utilize said rotor to equalize the total energy of the system.

17. In a gyroscopic stabilizer, the combination with the rotor, of a substantially constant speed induction motor spinning said rotor, a direct current motor for controlling the precession of the gyroscope, means driven from a common source for supplying current to said alternating current and direct current motors, said motors and generators being adapted either to absorb or to deliver energy in such a manner as to utilize said rotor to equalize the total energy of the system.

18. In a ship stabilizing apparatus, the combination with a moving part to be accelerated and retarded during a rolling cycle, of a fly wheel, means for rotating the same, and means utilizing the momentum of the fly wheel for accelerating and retarding said part.

19. In a ship stabilizing apparatus, the combination with a movable element of means for accelerating and retarding said element during a rolling cycle, a fly wheel mounted on said element, means for rotating the same, and means for utilizing the momentum of the fly wheel for driving said first named means when accelerating and means for driving the fly wheel from said first named means when decelerating said element.

20. The combination with a moving fly wheel of a gyroscopic stabilizer, of electrodynamic means for imparting energy to and absorbing energy from said fly wheel, electric dynamic means for controlling the precession of said stabilizer, and means for transferring energy from said first named to said second named means and for transferring energy from said second named to said first named means to equalize the energy requirements of the system.

21. The combination with a moving fly wheel of a gyroscopic stabilizer, of an induction motor for imparting energy to and absorbing energy from said fly wheel, an induction motor for controlling the precession of said stabilizer, and a common A. C. generator for said motors whereby said fly wheel may be utilized to deliver energy to the system during acceleration of the precession and to absorb energy from the system during de-celeration of the precession.

22. In a gyroscopic stabilizer system for a ship, the combination with the flywheel of the gyroscope, of a spinning motor therefor, said spinning motor being adapted to operate also as a generator absorbing energy from the flywheel, a precession motor for said gyroscopic stabilizer, said precession motor being adapted to operate also as a generator absorbing energy from the waves, and dynamic coupling means causing an interchange of energy between said two motors.

23. The combination with a vessel and a gyroscopic stabilizer therefor, of a spinning motor therefor, a precession motor therefor which is operable at times as a motor and at other times as a generator transforming energy from the rolling motion of the vessel, and means for causing the driving effect of said spinning motor to be reduced during the periods of motor operation of said precession motor.

24. The combination with the flywheel of a gyroscopic stabilizer, of a substantially synchronously-running alternating-current spinning motor therefor, a precession motor therefor which is operable at times as a motor and at other times as a generator, a prime mover having a falling speed-torque characteristic, generating means coupled thereto and connected to said motors, the generating means coupled to said spinning motor having a frequency dependent upon the speed of said prime mover.

In testimony whereof I have affixed my signature.

HERBERT H. THOMPSON.